United States Patent
Axnäs et al.

(10) Patent No.: US 8,295,871 B2
(45) Date of Patent: Oct. 23, 2012

(54) METHOD AND APPARATUS FOR LIMITING PEER-TO-PEER COMMUNICATION INTERFERENCE

(75) Inventors: Johan Axnäs, Solna (SE); Anders Furuskär, Stockholm (SE); Peter de Bruin, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 939 days.

(21) Appl. No.: 12/093,298

(22) PCT Filed: Nov. 11, 2005

(86) PCT No.: PCT/SE2005/001701
§ 371 (c)(1),
(2), (4) Date: May 9, 2008

(87) PCT Pub. No.: WO2007/055623
PCT Pub. Date: May 18, 2007

(65) Prior Publication Data
US 2008/0318612 A1 Dec. 25, 2008

(51) Int. Cl.
*H04B 7/00* (2006.01)
(52) U.S. Cl. .......... 455/522; 455/69; 455/41.2; 455/420
(58) Field of Classification Search .......... 455/41.2, 455/41.3, 418, 420, 522, 68–70, 115.3, 127.1, 455/135, 296, 428
See application file for complete search history.

(56) References Cited

U.S. PATENT DOCUMENTS

| | | | |
|---|---|---|---|
| 6,415,146 B1 * | 7/2002 | Capece | 455/517 |
| 6,539,017 B1 * | 3/2003 | Davison | 370/395.21 |
| 7,233,792 B2 * | 6/2007 | Chang | 455/422.1 |
| 7,239,874 B2 * | 7/2007 | Reddy et al. | 455/436 |
| 7,342,895 B2 * | 3/2008 | Serpa et al. | 370/254 |
| 7,386,043 B2 * | 6/2008 | Goldburg | 375/227 |
| 7,463,592 B2 * | 12/2008 | Poncini et al. | 370/252 |
| 7,463,890 B2 * | 12/2008 | Herz et al. | 455/445 |
| 7,684,813 B2 * | 3/2010 | Benson et al. | 455/517 |
| 7,813,291 B2 * | 10/2010 | Yoon et al. | 370/252 |
| 7,814,322 B2 * | 10/2010 | Gurevich et al. | 713/171 |
| 7,848,741 B2 * | 12/2010 | Kivekas et al. | 455/423 |
| 2003/0142638 A1 * | 7/2003 | Belcea | 370/321 |
| 2003/0144003 A1 | 7/2003 | Ranta et al. | |
| 2004/0116073 A1 * | 6/2004 | Mauney et al. | 455/41.2 |
| 2004/0203419 A1 * | 10/2004 | Crocker et al. | 455/67.11 |
| 2005/0107037 A1 * | 5/2005 | Delmulle et al. | 455/41.2 |
| 2005/0111383 A1 | 5/2005 | Grob et al. | |
| 2005/0239496 A1 * | 10/2005 | Sylvain | 455/552.1 |
| 2005/0250482 A1 * | 11/2005 | Seligmann et al. | 455/414.1 |
| 2006/0095582 A1 * | 5/2006 | Nitya et al. | 709/236 |
| 2006/0234630 A1 * | 10/2006 | Lai | 455/41.2 |
| 2006/0234697 A1 * | 10/2006 | Fernandez et al. | 455/425 |
| 2006/0240854 A1 * | 10/2006 | Lee et al. | 455/502 |
| 2008/0194241 A1 * | 8/2008 | Kretz | 455/417 |

FOREIGN PATENT DOCUMENTS

WO  WO 2005/050919 A2  6/2005

* cited by examiner

*Primary Examiner* — Dominic E Rego

(57) ABSTRACT

Peer-to-peer communication between user terminals in a licensed spectrum is enabled by a method comprising the following steps: —communicating directly, peer-to-peer, between the first and the second mobile terminal, and —disconnecting the peer-to-peer communication in dependence of control signals received or not received from the base station. Thus, according to the invention, the network is enabled to control the peer-to-peer communication between two user terminals.

17 Claims, 5 Drawing Sheets

METHOD AND APPARATUS FOR LIMITING PEER-TO-PEER COMMUNICATION INTERFERENCE

TECHNICAL FIELD

The present invention relates to a mobile terminal as defined in the preamble of claim 1 and a base station as defined in the preamble of claim 8. The invention also relates to a method of communication between a first and a second mobile terminal in a wireless network as defined in the preamble of claim 13.

BACKGROUND AND PRIOR ART

Radio spectrum is a limited resource in wireless networks. Therefore, intense efforts are made to use the available spectrum as efficiently as possible. With increasing demands for data communication and high bit rates this will become even more important in the future.

Typically different parts of the radio spectrum are licensed out to operators who build communications systems utilizing the relevant parts. These systems may be seen as the primary systems in each respective part of the radio spectrum.

When a piece of licensed radio spectrum is not used for a period of time for its primary purpose in a certain geographical network, for example, for wide area cellular communication, there will be a desire to use it for other purposes.

A potentially important use could be short range peer-to-peer communication, that is, direct communication without the use of intermediary nodes such as base stations, between the user terminals used in the primary communication system of the licensed spectrum.

A typical use of peer-to-peer communication could be over short distances, for example, for communication between one person's cellphone and laptop, or between two laptops on the same desk. Short distance means that a rather low transmit power is sufficient and hence that a single radio resource (frequency, time slot) that is not used for the primary system can be re-used for many simultaneous peer-to-peer communication sessions in physically separated places. Hence, a higher total throughput can be obtained within the given spectrum, compared to communicating through the primary system. This type of peer-to-peer communication can also be seen as a natural part of an "always best connected" concept, that is, to ensure that the type of connection utilizing the network resources in the most efficient way at any given time is always selected.

However, since peer-to-peer communication would take place in a licensed spectrum, network operators may be expected to require control of radio resources and the interference in the network. Prior art solutions for peer-to-peer communication do not account for this need.

The TETRA (Terrestrial Trunked Radio) concept provides a Managed Direct Mode (MDMO), described in the ETSI standard EN300396-10: "Managed Direct Mode Operation (M-DMO) enables the use of DMO to be controlled by providing a mechanism by which frequencies may be given for DMO use for a period of time. The objective of M-DMO is to constrain the transmission by the M-DMO terminals such that they will not transmit in a geographical area in which they are not authorized to transmit". The direct transmission between terminals is restricted by a broadcast signal indicating which mobile terminals are allowed to use the direct mode. There are no restrictions based on the actual effect of the peer-to-peer communication on the network.

OBJECT OF THE INVENTION

It is an object of the invention to enable direct communication between terminals in a wireless network while maintaining operator control of communication quality in the network.

SUMMARY OF THE INVENTION

This object is achieved according to the present invention by a mobile terminal for use in a wireless communication network said terminal comprising means for communicating with a base station in said communication network, said mobile terminal being characterized in that it comprises
    communication means for initiating direct communication directly with said other mobile terminal,
    control means for disconnecting said direct communication in dependence of signals received or not received from the base station.

The object is also achieved by a base station for use in a wireless communication network, said base station comprising communication means for communicating with at least one mobile terminal in the mobile communication network, said base station further comprising
control means for controlling peer-to-peer communication between at least a first and a second mobile terminal in the network by transmitting to at least one of the terminals at least one signal indicating whether or not the mobile terminal may engage in peer-to-peer communication.

The object is further achieved by a method of establishing communication between a first and at least a second mobile terminal in a wireless communication network, said method comprising the following steps:
    communicating directly, peer-to-peer, between the first and the second mobile terminal.
    disconnecting the peer-to-peer communication in dependence of control signals received or not received from the base station.

According to the invention, peer-to-peer communication is allowed, but may be controlled by the network, by means of control signals transmitted from the base station to one of the terminals participating in the communication, or to both, or all, terminals.

The apparatuses and method according to the invention enables central control and supervision of peer-to-peer communication. Thereby, peer-to-peer communication in a licensed spectrum is enabled without the drawbacks mentioned above. The peer-to-peer communication may be allowed or denied, for example, in dependence of the traffic situation in the network.

The peer-to-peer communication can be arranged with minor or no changes to the hardware of the terminals and base stations, since the radio interface is already pre-sent in the terminals. Also, it becomes possible for the network operator to charge for the use of the operator's spectrum.

The communication means is preferably arranged to probe the power level in direct, peer-to-peer, communication with another mobile terminal. This may, for example, be done by gradually increasing the power level during probing. Such probing will result in the lowest possible power level, and therefore a minimum level of generated interference. Alternatively, a maximum allowed power level may be defined, as the maximum power level where no complaints are received from any base station or other terminal. Probing may also be carried out by transmitting at a fix power level. This enables immediate peer-to-peer communication between the terminals.

The communication means may be arranged to apply a peer-to-peer identifier to the communication. The peer-to-peer identifier may be a single bit indicating that the communication is peer-to-peer communication, or a unique identifier for the peer-to-peer communication session. The peer-to-peer identifier may also be implicit in the communication, such as a predefined pattern of power level variations used for ramping and/or during the communication session.

To implement this function, the mobile terminal may also comprise interference means for identifying interference from peer-to-peer communication in the wireless communication network and for reporting said interference to the base station. This will enable decisions on whether or not peer-to-peer communication should be allowed, based on how such communication actually influences the network. Of course, this function may also be implemented in telephones that do not themselves have the functions required for peer-to-peer communication according to the invention.

In this way the actual effect of the peer-to-peer communication on other communication in the network can be taken into account and peer-to-peer communication which disturbs other communication can be terminated or allowed to continue with lower power levels.

The peer-to-peer identifier may be assigned to the respective terminal or communication session by the network, or it may be selected by peers.

The control means of the base station may be arranged to send said at least one signal in response to a request received from the first terminal. The control means may also be arranged to send said at least one signal in response to disturbance information received from other terminals.

For example, the control means may be arranged to send a signal if peer-to-peer communication is allowed and/or if peer-to-peer communication is not allowed.

In one embodiment, the control means of the base station is arranged to determine if peer-to-peer communication is allowed on the basis of interference information received from at least a third mobile terminal in the network.

The inventive method may be initiated by the first mobile terminal signalling to a base station in the wireless network to request permission to communicate directly with the second mobile terminal before starting peer-to-peer communication.

By allowing peer-to-peer traffic in the licensed spectrum network operators may offer new services and, at the same time, increase the traffic volume in the network. With network controlled peer-to-peer traffic the spectrum utilization can be increased. It may sometimes be desirable to allow peer-to-per admission even if it would prevent or interfere with normal traffic in the network, since the alternative may be to use the radio resources of the network. According to the invention the network can control the traffic according to information only found in the network about the use of network resources.

Peer-to-peer communication is mainly interesting for communication at short distances and high bit rates. Transmission latency may be significantly reduced if network nodes are not involved. For end users the peer-to-peer transmissions in the licensed spectrum may be more reliable than in the unlicensed spectrum, in particular when, as according to the invention, the use is under network control and supervision.

Two or more terminals may engage in peer-to-peer communication. Broadcast is possible, in which one terminal transmits the same signal to a number of other terminals. Alternatively, two or more terminals may communicate as they find suitable.

A short transmission time interval (TTI) is advantageous, to ensure that the terminals check at relatively short intervals whether or not peer-to-peer communication is still acceptable.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
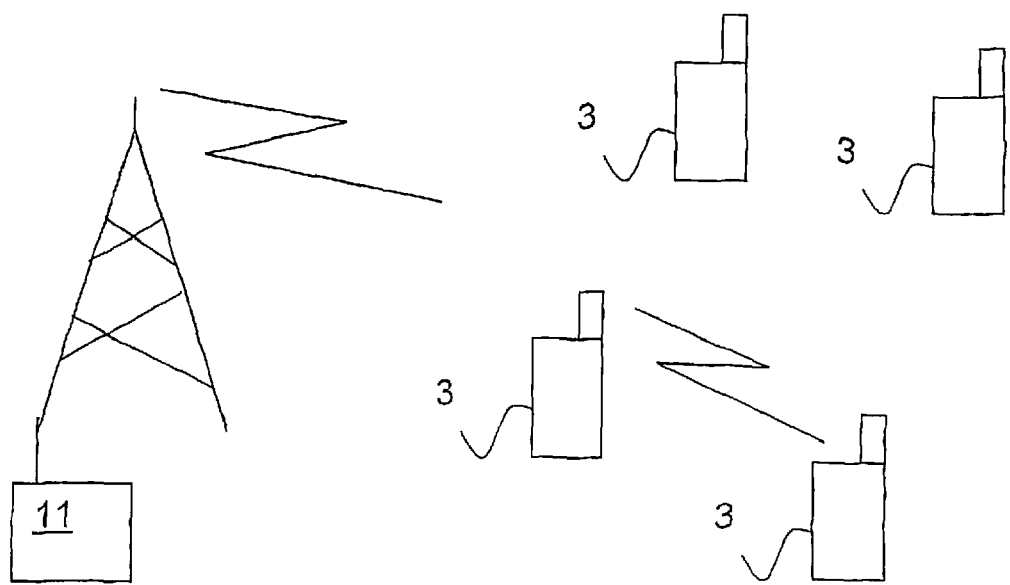
FIG. 1 illustrates a mobile communication system in which the method may be used.

FIG. 1 illustrates a cellular network in which the invention can be implemented. The network includes a number of base stations 1, each arranged to communicate with one or more mobile terminals 3 within an area often referred to as a cell. Usually, all communication between mobile terminals 3 passes through the network, that is, at least through a base station 1. If the mobile terminals 3 are located in different cells, switching units and other units of the network, not shown in FIG. 1, are also involved in ways well known in the art.

According to the invention, in certain circumstances, two mobile terminals can communicate directly with each other as indicated in FIG. 1. The basic function for enabling such direct communication, which is often called peer-to-peer communication, according to the invention is an admission control performed by a unit in the network, preferably the base station. For these control functions, the base station comprises a control unit 11, in addition to the conventional units of a base station.

Embodiments of the invention include probing and/or identification of the communication, as will be discussed in more detail below.

The terminal initiating the peer-to-peer communication may be referred to as the "master" terminal and the other terminal may be referred to as the "slave" terminal.

Probing. This is used to determine a suitable power level to use when communicating between the mobile terminals. Probing may be allowed on request from the terminal to the base station. Alternatively, probing may always be allowed, or allowed according to a broadcast message.

Probing may be performed selectively on carriers/sub-carriers where other signals are not detected, or on carriers/sub-carriers for which the network will allow it. It may be made necessary to carry out probing at regular time intervals, or after certain events in the network, to ensure that minimum power levels are always used.

Probing may be performed by starting transmissions immediately at a fix power level, which is known normally to be sufficient for short-range communication. A more sophisticated way is to start with a lower power level and successively increase the power until a sufficient level has been reached. This principle is referred to as power ramping. This will result in a minimum power level, and therefore a minimum level of generated interference. The power during ramping may be any monotonous or non-monotonous function of time. During the probing phase acknowledgement signals from the receiving terminal are used by the initiating terminal to determine if the signal has been received, that is, if the power level is sufficient.

During the probing phase mobile terminals that experience interference from the peer-to-peer communication may report this to their service base station or the base station serving the mobile terminals engaged in peer-to-peer communication. If the probing has not resulted in unacceptable interference levels, the serving base station admits the peer-to-peer communication. Mobile terminals may report experienced interference during the peer-to-peer session as well. The base station's reaction may be a P2P remove message to discontinue the peer-to-peer session or a P2P reduce message to reduce the power levels used for the peer-to-peer session. Different power levels may be used by the different terminals involved, for example, if one terminal is close to, and may disturb, other terminals, while the other terminal is located further away from other terminals.

Identification. Direct, or peer-to-peer traffic is identified so that it can be recognized by other nodes or units in the network as such. A specific identifier is assigned to peer-to-peer communication to make it separable from regular communication. Because of this, other nodes can listen and object if their communication is interfered with. The use of a specific identifier for peer-to-peer traffic ensures that terminals that are disturbed by regular, (not peer-to-peer) traffic report this to the network.

Identification may be implicit in that a special pattern of ramping characteristics may be used to identify peer-to-peer transmission indirectly through similar variations in CQI reports from interfered terminals.

Peer-to-peer identity may be only a single information bit (indicating peer-to-peer communication or not), or include a unique identity for the peer-to-peer connection.

An identity number for each peer-to-peer connection may be assigned by the network, or may be randomly selected by peers. The latter is particularly useful if probing is to be performed without prior request.

Admission control. Peer-to-peer communication is only allowed when the interference in the network can be kept at an acceptable level, so that the service quality is satisfactory. The admission control may be executed by the base station sending ok messages when the mobile terminal is allowed to transmit directly to another mobile terminal. Alternatively, the base station may send a not ok message when direct communication is not allowed. In this case the terminal can continue to transmit if no explicit not ok message is received. Of course, the base station may also send messages both when direct communication is allowed and when it is not.

A general broadcast message from the base station may be used to indicate if probing is allowed or not at a certain time. For example, if there is much traffic in the network peer-to-peer communication may not be allowed at all and therefore no probing is permitted. At times when the traffic is low terminals may always be allowed to start probing without any request to the base station.

Admission control at the start of probing or communication is usually initiated by the first mobile terminal requesting permission for probing, or for starting peer-to-peer communication, from the base station. It may also be executed during peer-to-peer communication. For example, if the base station receives reports from other mobile terminals that the peer-to-peer communication causes interference, it may order the peer-to-peer communication to be terminated, or that the power level be reduced. Alternatively, for continued communication to be allowed ok signals at regular intervals from the base station to one or more of the terminals may be required. The signal may be sent to either of the terminals, or to both.

Admission may be given for the whole carrier, or one or more parts of the carrier. The permission to transmit may be signalled to one or both peers.

It may be possible that only one of the terminals is allowed to transmit, for example if the other terminal cannot transmit without disturbing other traffic. In this case, the other terminal may be allowed to send acknowledge (ACK) and/or not acknowledge (NACK) signals through the network instead of sending them peer-to-peer.

If admission is denied, the message may be accompanied by a suggestion for another radio resource that may be probed, for example, another carrier.

If, at some point during peer-to-peer communication, it is determined that it disturbs other terminals in the network, the base station may order the peer-to-peer communication to end. Typically, before engaging in peer-to-peer communication again the terminal must wait a certain period of time and/or perform probing again.

It is possible that only a part of the traffic in the network is disturbed, for example, only downlink or only uplink traffic. It is likely that downlink traffic may be more prone to disturbances. Therefore, it may be ordered that the terminals may use only the time/frequency slots used for uplink for peer-to-peer communication. Of course, they may also be allowed to use only the time/frequency slots used for downlink in a similar way if this is found to be advantageous. In many cases, the terminal may know, or may be able to determine for itself, which time/frequency slots are used for uplink and downlink, respectively. If not, this information may be found in the ok message transmitted from the base station. The ok message may also comprise other types of limitations, for example, a maximum duration for the peer-to-peer connection.

Charging for the communication may be made dependent on whether the master or the slave, or both, or neither, are subscribers in the primary network. Charging may also be based on how many other users are interfered, how many are close enough to be potentially interfered, the power used in the peer-to-peer communication, or other factors. For example, a lower rate may be used, or peer-to-peer communication may be free of charge, if the master terminal or both terminals are subscribers in the primary network. As another example, the peer-to-peer communication may be free of charge if no other users are interfered.

Figure 2:
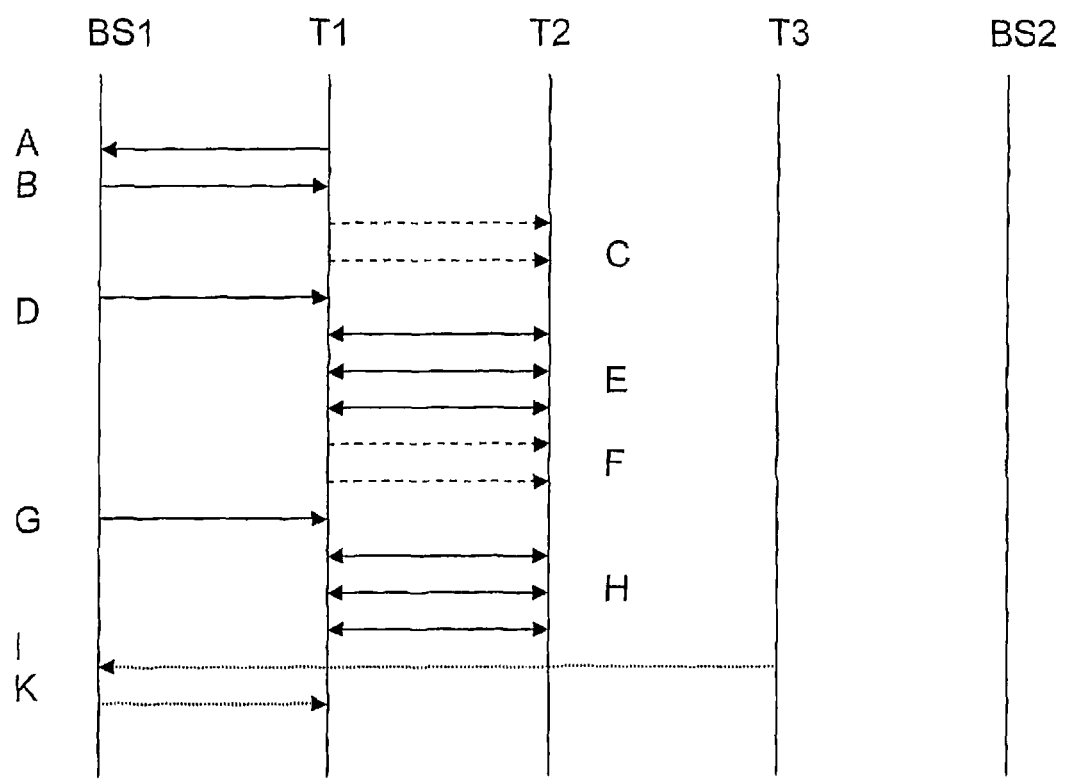
FIG. 2 is a message sequence chart according to one embodiment of the invention.

FIG. 2 is a message sequence chart illustrating the signalling between different units in the network according to one embodiment of the invention. The participating units are:

The first user terminal involved in the peer-to-peer communication, T1, the second user terminal involved in the peer to peer communication, T2, a third user terminal T3, which is not involved in the peer-to-peer communication, T3, the first base station BS1, to which the first user terminal T1 is connected and the second base station BS2, to which the second user terminal T2 is connected. Of course, T1 and T2 may be connected to the same base station, for example, to BS1.

According to this embodiment the signalling starts with the first user terminal T1 sending a probing request A to the first base station BS1. The base station responds by sending a probing ok message B. The first terminal T1 then probes the second terminal T2 as discussed above. The probing signals are illustrated as two dashed lines C. The third terminal T3 listens to the probing signals between the first and the second terminal T1, T2. If the third terminal T3 experiences interference, or interference above a certain level, it may inform either the first base station BS1, or the base station to which it is connected about this. The first base station then decides whether or not peer-to-peer communication between the first and the second terminal should be allowed, on the basis of any reports of interference from the third, or any other, terminal. If no interference, or only interference below a certain level, is reported, then an ok signal D will be transmitted from the base station BS1 to the mobile terminal T1, to indicate that peer-to-peer communication may proceed. The peer-to-peer communication between the first and the second terminal T1, T2 is illustrated as three solid arrows E.

The third terminal T3 will continue to listen during the peer-to-peer communication and may report interference at any time. As discussed above, the peer-to-peer communication may be identified on the basis of an identifier added to the messages, or a predefined power level pattern during probing. After a while new probing is performed, shown as dashed lines F, and a new ok signal G is received from the base station. Alternatively, the base station receives a disturbance indication from the third terminal T3 that it is being disturbed, shown as a dotted line I, and sends a remove/reduce signal, also shown as a dotted line K to the mobile terminal T1. After this remove/reduce signal the communication either continues with a lower power, or is terminated.

Both the message sequence chart in FIG. 2 and the flow charts in FIGS. 3-5 below start at the point where a first terminal has decided that it wants to start peer-to-peer communication if possible. This point may be preceded by other steps, such as a short sequence of signalling between the first terminal and the terminal or terminals with which it wants to communicate. This is common in the art and is not discussed in any detail here, since it is not important for the invention. Peer-to-peer communication may also be initiated by the user of the terminal, or by the base station. In the latter case, a command from the base station is transmitted to the terminal without any request from the terminal.

Figure 3:
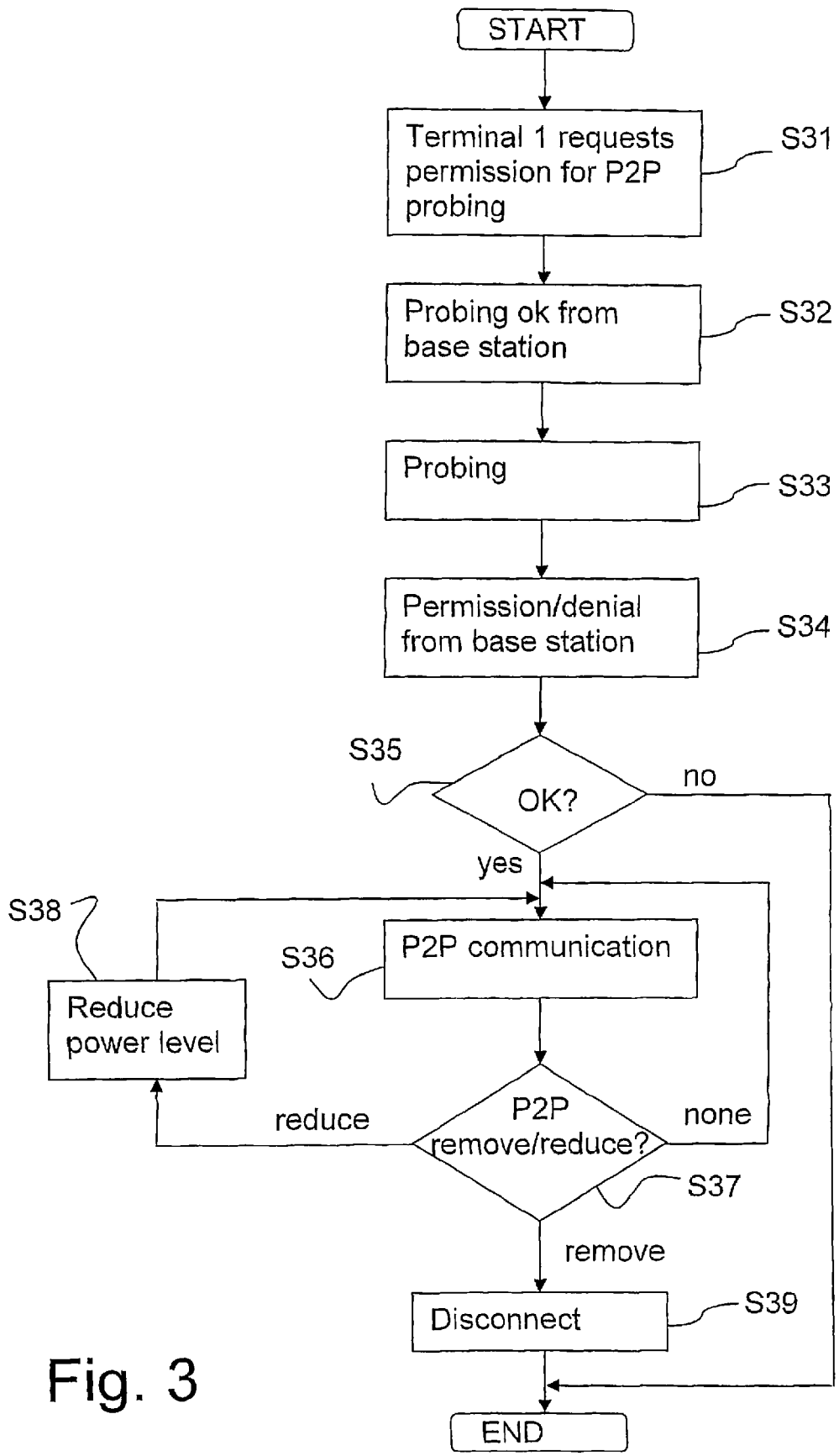
FIG. 3 is a flow chart according to a first embodiment of the invention.

FIG. 3 is a flow chart of a first embodiment of the invention as seen by the mobile terminal.

In step S31 the first, or master, terminal requests permission to start probing for peer-to-peer communication with another terminal.

In step S32 the first terminal receives a "probing ok" signal from the base station.

In step S33 the first and second terminals perform probing.

In step S34 a permission signal or a denial signal is received from the base station in both the first and the second terminal, or just in the first terminal.

In step S35 the signal received from the base station is evaluated. If yes go to step S36; if no, end of procedure.

In step S36 peer-to-peer communication is performed between the first and the second terminal.

In step S37 the terminal checks if a remove signal or a reduce signal has been received from the base station. If a remove signal has been received, go to step 39; if a reduce signal has been received, go to step 38; if no signal has been received, return to step S36.

In step S38 the power level used by one or both terminals is reduced and the procedure returns to step S36.

In step 39 the peer-to-peer communication is disconnected.

This method can be varied in a number of ways, for example, the following.

Steps S31 and S32 may be omitted, for example if probing is always allowed, or if a broadcast message has been distributed indicating that probing is allowed.

In step S33 the probing may be implicit, that is, it may be performed during the peer-to-peer communication between the terminals.

In step S34 the permission, or the denial, may be implicit. In the former case, peer-to-peer communication is allowed if no signal is received from the base station. In the latter case, peer-to-peer communication is denied if no explicit ok signal is received from the base station.

Figure 4:
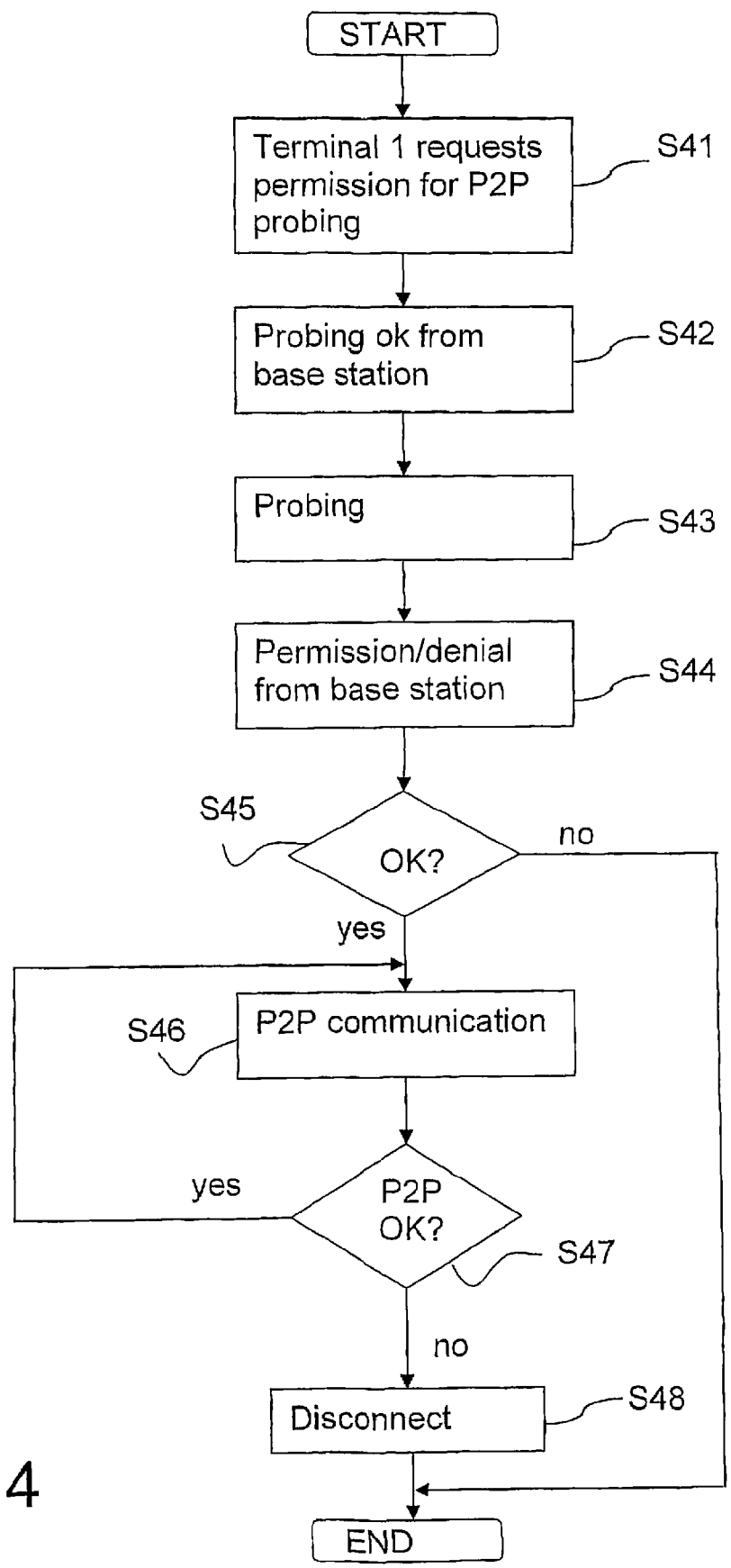
FIG. 4 is a flow chart according to a second embodiment of the invention.

FIG. 4 is a flow chart of a second embodiment of the invention as experienced by the terminal.

In step S41 the first, or master, terminal requests permission to start probing for peer-to-peer communication with another terminal.

In step S42 the first terminal receives a "probing ok" signal from the base station.

In step S43 the first and second terminal perform probing.

In step S44 a permission signal or a denial signal is received from the base station in both the first and the second terminal, or just in the first terminal.

In step S45 the signal received from the base station is evaluated. If yes go to step S46; if no, end of procedure.

In step S46 peer-to-peer communication is performed between the first and the second terminal.

In step S47 the terminal checks if an ok signal has been received from the base station. If an ok signal has been received, return to step S46; if no ok signal has been received, go to step S48.

In step 48 the peer-to-peer communication is disconnected.

As in FIG. 3, steps S41 and S42 may be omitted. In step S43 the probing may be implicit. In step S44 the permission, or the denial, may be implicit.

Figure 5:
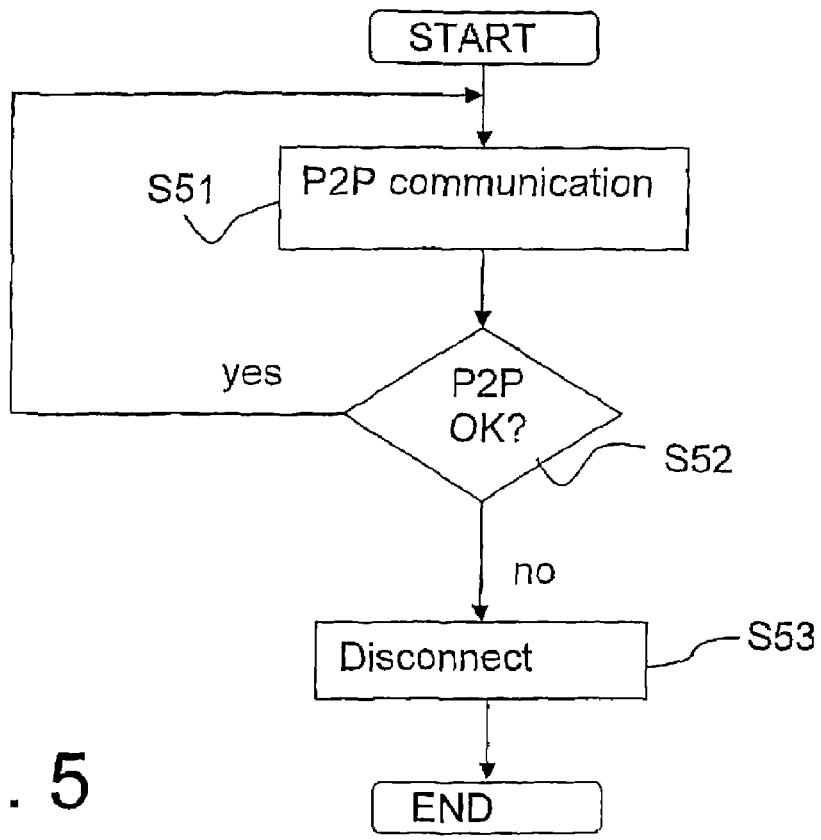
FIG. 5 is a flow chart according to a third embodiment of the invention.

FIG. 5 is a flow chart of a simpler embodiment of the invention than those shown in FIGS. 3 and 4. In step S51 the mobile terminal simply starts communicating with the second terminal. The communication may begin with probing or may start right away. In step S52 an ok signal or a not ok signal is received from the base station. According to this embodiment the terminal will continue to communicate until a not ok signal is received. The not ok signal may be a remove or reduce signal, that is, may order the terminals to disconnect, or to reduce the power used for peer-to-peer communication. If a not ok signal is received the peer-to-peer communication is disconnected in step S53. According to a first variant of this embodiment, an ok signal from the base station is required after a certain period of time. In this case, the peer-to-peer communication must be terminated if no ok signal is received from the base station within a certain period of time after the beginning of the peer-to-peer communication.

Figure 6:
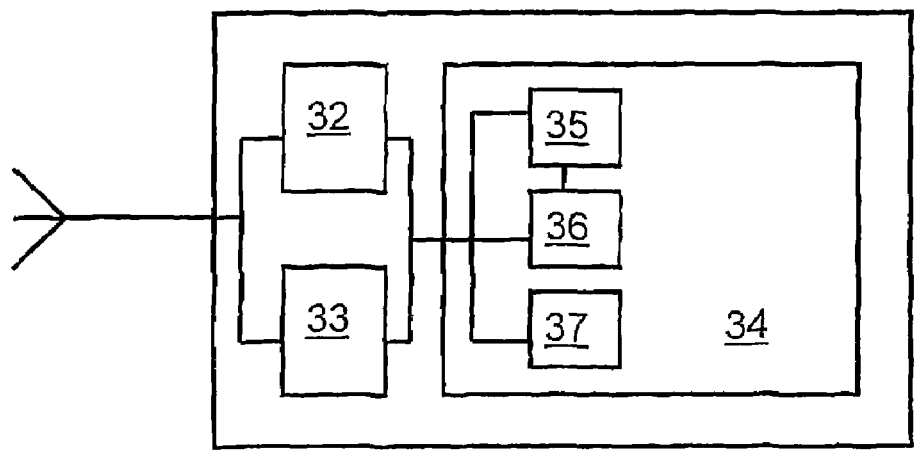
FIG. 6 illustrates, schematically, a mobile terminal comprising the functions needed according to the invention.

FIG. 6 illustrates a mobile terminal 3 according to the invention. The mobile terminal 3 comprises an antenna 31 for communicating with the base station, and with other mobile terminals in peer-to-peer communication. A transmit part 32 and a receive part 33 are connected to the antenna. Both the transmit part 32 and the receive part 33 are controlled by a processor 34. All of this is well known in the art. According to the invention, in addition to the conventional functions of the terminal, the processor 34 comprises software functions for controlling the peer-to-peer communication, and the communication with the base station related to the peer-to-peer communication.

In particular the processor 34 comprises a communication unit 35 for initiating peer-to-peer communication with another mobile terminal and a control unit 36 for receiving signals from the base station related to the peer-to-peer communication and to act upon these signals. In particular, the control unit 36 is arranged to receive and interpret ok or not ok signals, or reduce signals, from the base station and start, continue, or disconnect the peer-to-peer communication as ordered by these signals. The control unit 36 may also be arranged to transmit a probe request to the base station and to wait for a response from the base station before probing or transmitting. Thus, the control unit 36 controls the peer-to-peer communication performed by the communication unit 35.

According to an embodiment of the invention the communication unit 35 is arranged to transmit probing signals to the second mobile terminal before engaging in communication. The probing signals may be sent with a fix power level which is assumed to be appropriate, or may start at a lower power level and increase if necessary, as discussed above.

According to an embodiment of the invention the communication unit 35 is arranged to add an identifier to the peer-to-peer probes and peer-to-peer communication, to enable the base station, and other terminals that may be disturbed by it to identify it as peer-to-peer and report this to the base station. Accordingly the processor also comprises interference means 37 arranged to detect any disturbing traffic caused by other terminals and, if it is identified as peer-to-peer communication based on said identifier, report the disturbance to the base station.

As the skilled person will understand the different units 35, 36, 37 are logical units only, intended for illustration purposes. Of course, the functions could be performed by the same unit, or be distributed on different units as is found to be functional.

Figure 7:
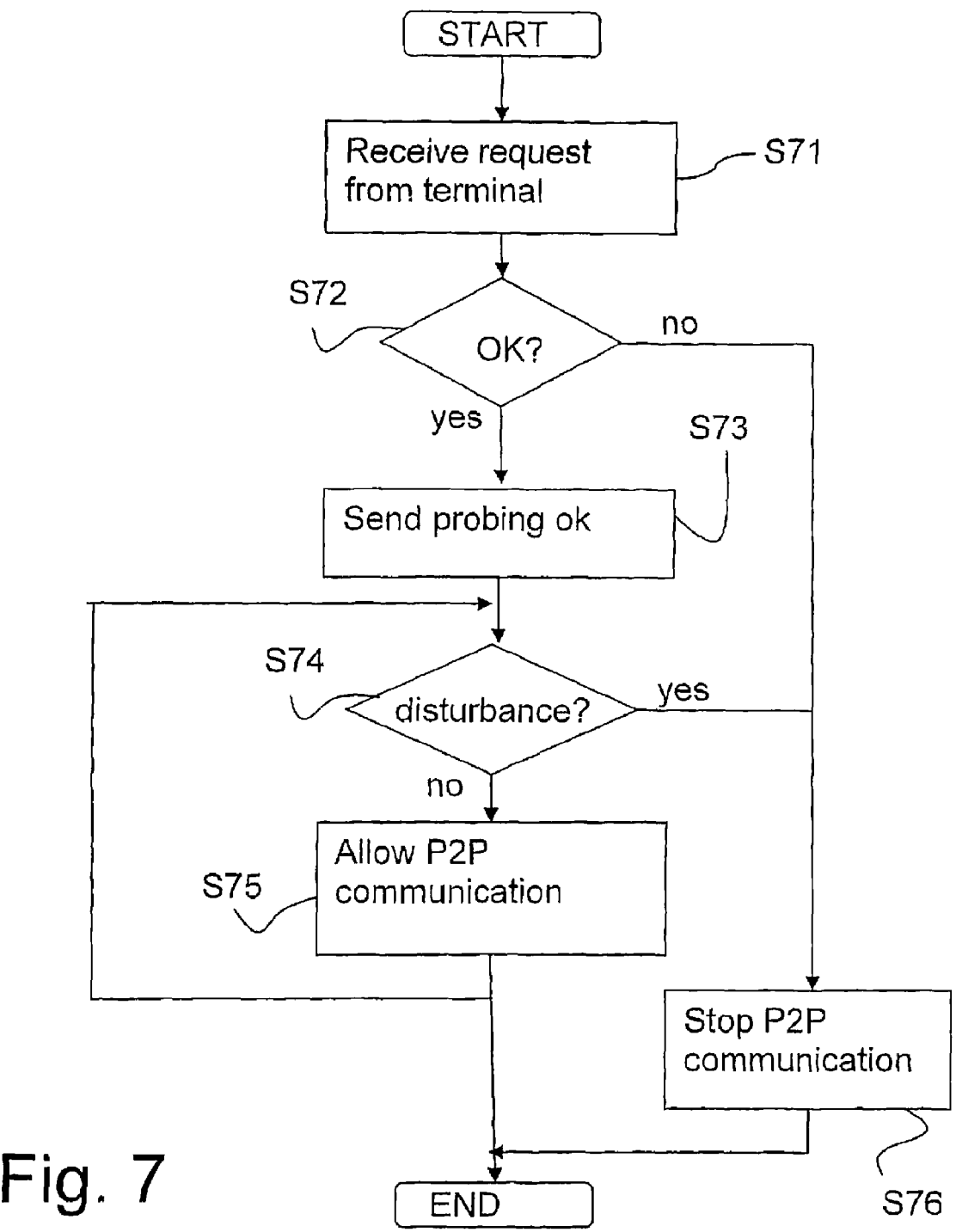
FIG. 7 is a flow chart of the method as experienced by the base station.

FIG. 7 is a flow chart of the method as experienced by the base station. Again, as will be obvious from the above discussions, a number of variants are possible.

In step S71 a request from a terminal to start probing for peer-to-peer communication with another terminal is received.

In step S72 the base station determines if it is ok to start probing. If yes, go to step S73; if no, go to step 76.

In step S73 the base station sends a response to the mobile terminal indicating if probing is acceptable.

In step S74 the base station determines if any reports of interference caused by the peer-to-peer communication has been received. If yes; go to step S76, if no, go to step S75.

Step S75: the base station sends a response to the mobile terminal indicating that it is ok to start peer-to-peer communication and returns to step S74.

Step S76: the base station indicates to the mobile terminal that probing and/or peer-to-peer communication is not allowed and, if ongoing, should be terminated.

As before, steps S71 and S72 are optional and may be omitted. The terminal may start probing and/or communicating without explicitly requesting permission from the base station. The signalling in steps S73, S75 and S76 may in each case be replaced by implicit ok or not ok signals, respectively. In steps S73 and S75 this would mean that if peer-to-peer communication is allowed, no signal is sent from the base station. The terminal can then engage in peer-to-peer communication until a reduce/remove command is received from the base station. Conversely, in step S76 the command to stop peer-to-peer communication may be implicit in that an ok signal is required at certain times for the terminal to continue peer-to-peer communication. In step S76 the base station may also send a peer-to-peer reduce signal to the mobile terminal, to indicate that the peer-to-peer communication may continue but with a reduced power level.

The invention claimed is:

1. A mobile terminal for use in a wireless communication network said terminal comprising means for communicating with a base station in said communication network, said mobile terminal comprising:
   communication means for initiating direct communication directly with another mobile terminal, the communication means being arranged to probe a power level by transmitting probing signals with a gradually increasing transmission power level, wherein each probing signal includes a peer-to-peer identifier that identifies the probing signal as a peer-to-peer communication,
   interference means for identifying interference from peer-to-peer communication in the wireless communication network and for reporting said interference to the base station, and
   control means for disconnecting said direct communication in dependence of signals received or not received from the base station, wherein the signals comprise messages indicating whether the mobile terminal is allowed to initiate peer-to-peer communication.

2. A mobile terminal according to claim 1, wherein the peer-to-peer identifier is a single bit indicating that the communication is peer-to-peer communication.

3. A mobile terminal according to claim 1, wherein the peer-to-peer identifier is a unique identifier for the peer-to-peer communication session.

4. A mobile terminal according to claim 1, further comprising interference means for identifying interference from peer-to-peer communication in the wireless communication network and for reporting said interference to the base station.

5. A base station for use in a wireless communication network, said base station comprising communication means for communicating with at least one mobile terminal in the mobile communication network, said base station further comprising control means for controlling peer-to-peer communication between at least a first and a second mobile terminal in the network by:
   receiving, at the base station interference information from at least a third mobile terminal in the network, wherein the interference information indicates an amount of interference experienced by the third mobile terminal that is caused or would be caused by peer-to-peer communication between the first mobile terminal and the second mobile terminal; and
   transmitting to at least one of the first and the second terminals at least one signal indicating, based on the interference information received from the third mobile terminal, whether or not the at least one mobile terminal may engage in peer-to-peer communication.

6. A base station according to claim 5, wherein the control means is arranged to send said at least one signal in response to a request received from the first terminal.

7. A base station according to claim 5, wherein the control means is arranged to send a signal if peer-to-peer communication is allowed.

8. A base station according to claim 5 wherein the control means is arranged to send a signal if peer-to-peer communication is not allowed.

9. A method of establishing communication between a first and a second mobile terminal in a wireless communication network, said method comprising the following steps:
   probing to determine a power level for peer-to-peer communication by transmitting probing signals with a gradually increasing transmission power level, wherein each probing signal includes a peer-to-peer identifier that identifies the probing signal as a peer-to-peer communication;

communicating directly, peer-to-peer, between the first and the second mobile terminal;

disconnecting the peer-to-peer communication in dependence of control signals received or not received from the base station, wherein the signals comprise messages indicating whether the mobile terminal is allowed to initiate peer-to-peer communication;

identifying interference from peer-to-peer communication in the wireless communication network based on one or more probing messages received from a third mobile terminal; and reporting said interference to the base station.

10. A method according to claim 9, further comprising the step of the first mobile terminal signaling to a base station in the wireless network to request permission to communicate directly with the second mobile terminal before starting peer-to-peer communication.

11. A method according to claim 9, further comprising the step of disconnecting the peer-to-peer communication if a remove signal is received from the base station.

12. A method according to claim 9, further comprising the step of reducing the power used for peer-to-peer communication if a reduce signal is received from the base station.

13. A method according to claim 9, further comprising the step of disconnecting the peer-to-peer communication if an ok signal is not received from the base station.

14. A method of managing peer-to-peer communication in a wireless communication network, the method comprising:

receiving, at a base station, interference information from at least a third mobile terminal in the network, wherein the interference information indicates an amount of interference experienced by the third mobile terminal that is caused or would be caused by peer-to-peer communication between a first mobile terminal and a second mobile terminal; and transmitting to at least one of the first mobile terminal and the second mobile terminal at least one signal indicating, based on the interference information received from the third mobile terminal, whether or not the at least one mobile terminal may engage in peer-to-peer communication.

15. A method according to claim 14, wherein transmitting said at least one signal comprises transmitting said at least on signal in response to a request received from the first terminal.

16. A method according to claim 14, wherein transmitting said at least one signal comprises transmitting said at least one signal if peer-to-peer communication is allowed.

17. A method according to claim 14, wherein transmitting said at least one signal comprises transmitting said at least one signal if peer-to-peer communication is not allowed.

* * * * *

UNITED STATES PATENT AND TRADEMARK OFFICE
CERTIFICATE OF CORRECTION

PATENT NO. : 8,295,871 B2
APPLICATION NO. : 12/093298
DATED : October 23, 2012
INVENTOR(S) : Axnas et al.

Page 1 of 1

It is certified that error appears in the above-identified patent and that said Letters Patent is hereby corrected as shown below:

In Column 2, Line 56, delete "pre-sent" and insert -- present --, therefor.

In Column 10, Line 41, in Claim 5, delete "station" and insert -- station, --, therefor.

Signed and Sealed this
Second Day of April, 2013

Teresa Stanek Rea
*Acting Director of the United States Patent and Trademark Office*